(12) United States Patent
Rothermel et al.

(10) Patent No.: US 7,810,101 B2
(45) Date of Patent: Oct. 5, 2010

(54) TASK HARMONIZATION LAYER

(75) Inventors: Gunther Rothermel, Rauenberg (DE); Teodor Joav Bally, Berlin (DE)

(73) Assignee: SAG AG, Walldorf (DE)

( * ) Notice: Subject to any disclaimer, the term of this patent is extended or adjusted under 35 U.S.C. 154(b) by 1282 days.

(21) Appl. No.: 11/315,577

(22) Filed: Dec. 21, 2005

(65) Prior Publication Data

US 2007/0156730 A1 Jul. 5, 2007

(51) Int. Cl.
G06F 15/16 (2006.01)
G06F 17/00 (2006.01)
(52) U.S. Cl. .................................. 719/320; 715/700
(58) Field of Classification Search ............... 719/320; 715/700
See application file for complete search history.

(56) References Cited

U.S. PATENT DOCUMENTS 7,328,233 B2 * 2/2008 Salim et al. ................ 709/202
2004/0034707 A1 * 2/2004 Royer ......................... 709/227
2004/0054787 A1 * 3/2004 Kjellberg et al. ............ 709/228
2004/0172460 A1 * 9/2004 Marel et al. ................. 709/217
2004/0215757 A1 * 10/2004 Butler ......................... 709/223
2005/0033588 A1 * 2/2005 Ruiz et al. ..................... 705/1
2006/0168530 A1 * 7/2006 Muller et al. ................ 715/751

* cited by examiner

*Primary Examiner*—Hyung S Sough
*Assistant Examiner*—Abdou K Seye
(74) *Attorney, Agent, or Firm*—Mintz, Levin, Cohn, Ferris, Glovsky and Popeo, P.C.

(57) ABSTRACT

First data associated with a task originating from one of a plurality of applications may be received via a communications network. Thereafter, an entity to which the task has been assigned may be identified to allow for an associated delivery context to be determined. A format of the first data may be converted so that it is compatible with the determined delivery context to generate second data. This second data may be transmitted to a node associated with the entity via the communications network. A user interface associated with the first node may be operable to initiate one or more transactions associated with the task using the second data. Related techniques, apparatuses, systems, and computer program products are also described.

12 Claims, 4 Drawing Sheets

TASK HARMONIZATION LAYER

TECHNICAL FIELD

The subject matter described herein relates to a task harmonization layer for associating, for example, tasks originating from a plurality of heterogeneous applications with a plurality of heterogeneous user interfaces.

BACKGROUND

Companies are increasingly adopting multiple applications which are used to generate and assign various tasks to entities (e.g., individuals, business units, processes, etc.) across an enterprise. At the same time, entities for which the tasks are being assigned are utilizing numerous user interfaces to perform tasks and associated planning. However, incompatibilities exist such that only certain user interfaces may be used to handle certain tasks thereby increasing an amount of time to process such tasks.

SUMMARY

In one aspect, first data associated with a task originating from one of a plurality of applications may be received via a communications network. Using the first data, an entity to which the task has been assigned may be identified. In addition, the first data may be used to determine a delivery context for the entity. When the delivery context has been identified, a format of the first data may be converted to be compatible with the determined delivery context to generate second data. This second data may be transmitted to a first node associated with the entity via the communications network so that a user interface associated with the first node may initiate one or more transactions associated with the task using the second data (e.g., complete the underlying task or a portion thereof).

In some circumstances, the first data may be routed to the first node without any conversion. For example, the determined delivery context may be in a format that is compatible with the first data thereby obviating the need for a conversion. In addition, the first data may be transmitted to the first node and only converted if an error or other message (or lack thereof) is received in response to the transmission.

The selection of the delivery context may take into account a user interface currently utilized by an entity to which the task has been assigned. This information may be obtained by polling a node associated with the entity, using an IP address for the node, and/or by receiving periodic beacon signals from the node and/or the user interface. If an entity is currently utilizing a mobile phone, the delivery context may modify the task data so that it is compatible with a user interface (e.g., Outlook, universal worklist user interface, etc.) for the mobile phone.

After the second data is transmitted to the first node, third data generated by the entity may be received that indicates a processing state of the task. For example, if the task relates to the pre-approval of budgeted travel expenses for an individual, an entity such as a supervisor, may be sent a message or an alert which would require him or her to either approve, reject, or approve in part the travel budget. This action would take place via a user interface local to the supervisor. Once a selection has been made, such information is transmitted so that it can be converted, if needed, into a format compatible with the application that generated the task. The processing state can also refer to any status information such as percentage of completion (especially if multiple entities are working on a single task), number of days overdue, date of last action item, and the like.

The progress of various tasks may be monitored and related information may optionally be stored in a data repository (which can provide historical information relating to task assignments and completion). This monitoring may log task data received from initiating applications as well as entity responses to such task data. The monitoring may retransmit data to entities if responses are not received within predetermined time intervals and/or if responses do not meet certain pre-defined criteria (i.e., they are incomplete). In addition, the monitoring may be used to determine alternate entities and/or alternate delivery contexts in cases where compliant responses are not received. In such cases, the first data may be converted into a different format for the revised receiving entity and/or delivery context.

In an interrelated aspect, first data associated with a task may be transmitted to a task harmonization layer via a communications network. The task harmonization layer may be operable to identify an entity to which the task has been assigned, determine a delivery context for the entity, convert a format of the first data to be compatible with the determined delivery context to generate second data, and transmit the second data to a first node associated with the entity via the communications network so that user interface associated with the first node may initiate one or more transactions associated with the task using the second data. After the first data has been transmitted, a response to the transmission of the first data may be received from the entity via the task harmonization layer.

In still another interrelated aspect, a first node associated with an entity may receive first data from a task harmonization layer. This first data may be associated with a task generated by one of a plurality of applications as second data. The task harmonization layer may use the second data to identify an entity to which the task has been assigned, determine a delivery context for the entity, convert a format of second data received from the one of the plurality of applications to be compatible with the determined delivery context to generate the first data, and transmit the first data to the first node. The user interface associated with the entity may initiate one or more transactions associated with the task using the first data. Thereafter, third data identifying a processing state of the task may be generated and transmitted to the one of the plurality of applications via the task harmonization layer so the application may initiate one or more transactions associated with the task using the third data.

Computer program products, tangibly embodied in information carriers are also described. Such computer program products may cause a data processing apparatus to conduct one or more operations described herein.

Similarly, systems are also described that may include a processor and a memory coupled to the processor. The memory may encode one or more programs that cause the processor to perform one or more of the operations described herein.

The subject matter described herein provides many advantages. For example, the task harmonization layer allows for a greater flexibility in the user interfaces used in connection with the processing of tasks, thereby increasing efficiency of users.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

As used herein, the term "task" includes any action within a workflow process that is generated via a computing system that requires human intervention and/or notification for completion. Tasks may be atomic (e.g., single step), multistep and/or nested (i.e., represent processes themselves comprising atomic tasks or nested tasks) and may be assigned to individuals, business units, or other organizational structures. Tasks may be conveyed in a matter which requires the assignee of the task to complete some action, notify an assignee of the task, and/or provides an immediate notification to an assignee.

Figure 1:
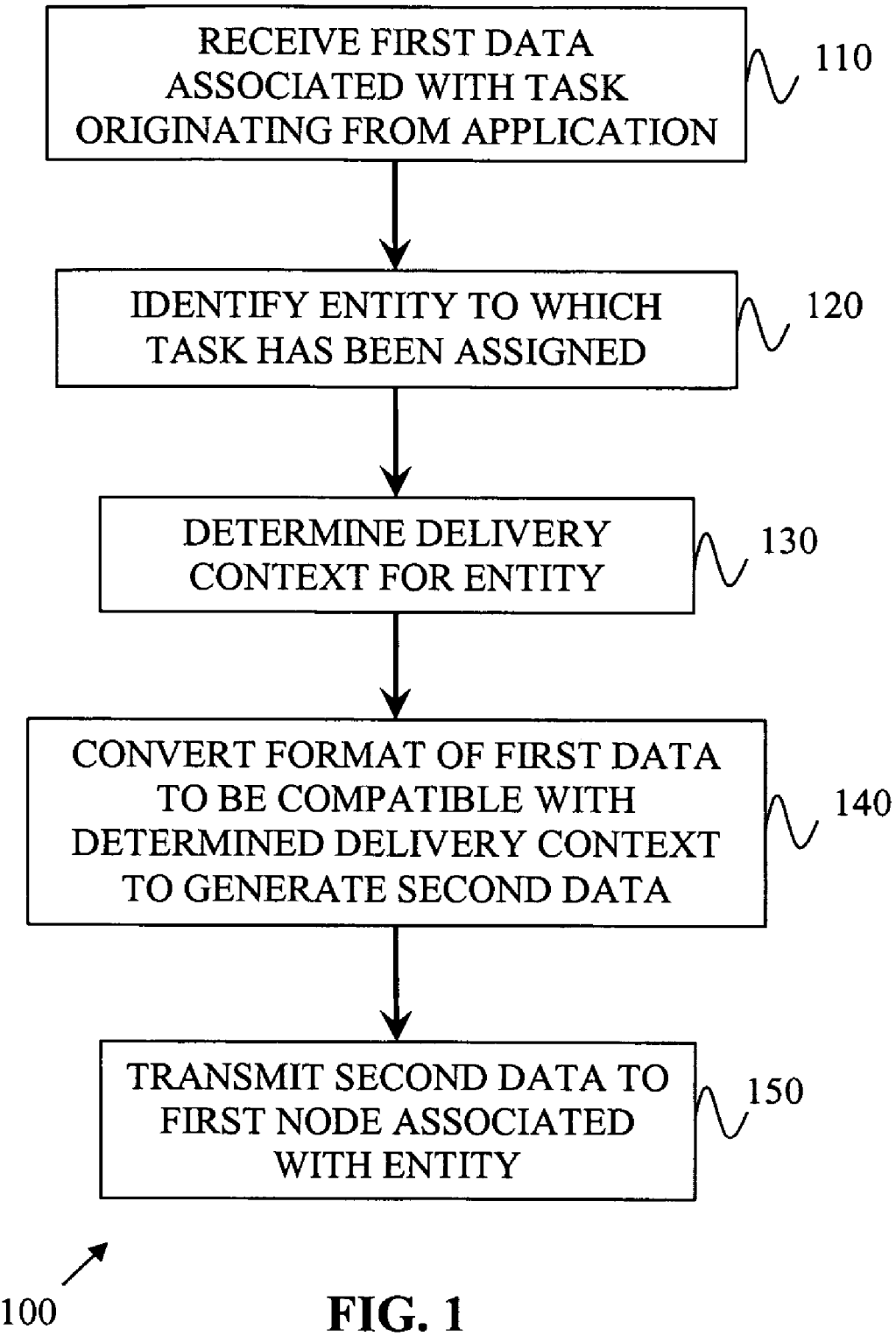
FIG. 1 is a process flow diagram illustrating a method of handling tasks among a plurality of applications and a plurality of user interfaces.

FIG. 1 is a process flow diagram of a method 100 in which, at 110, first data associated with a task originating from one of a plurality of applications (e.g., a workflow application, a CRM application, MS Outlook Exchange Server, SAP A1S, etc.) is received via a communications network. Thereafter, at 120, an entity to which the task has been assigned (also referred to as an assignee) is identified. Based on this identification, at 130, a delivery context for the entity is determined so that a format of the first data is converted, at 140, to be compatible with the determined delivery context to generate second data. This second data is transmitted, at 150, to a first node associated with the entity via the communications network. The first node comprises an associated user interface (e.g., MS Outlook, a universal worklist user interface, etc.) that is operable to initiate one or more transactions associated with the task using the second data.

Figure 2:
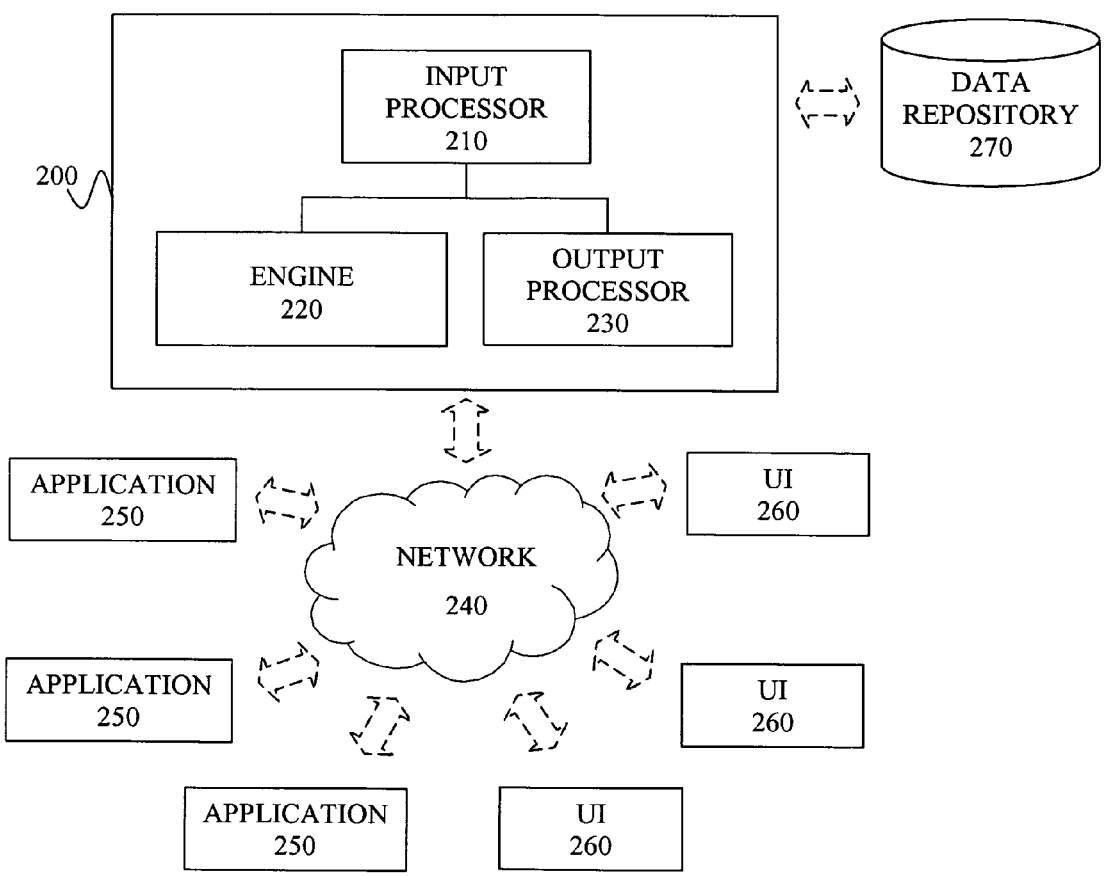
FIG. 2 is a schematic diagram illustrating an apparatus for handling tasks among a plurality of applications and a plurality of user interfaces.

FIG. 2 illustrates an apparatus 200 comprising an input processor 210, an engine 220, and an output processor 230. The apparatus 200 may be coupled to a plurality of applications 250 (i.e., nodes associated with the plurality of applications) and a plurality of user interfaces 260 (i.e., nodes associated with user interfaces) via a communications network 240 (e.g., a packet-switched network such as the Internet). Optionally, the apparatus may be coupled to or include a data repository 270.

The input processor 210 is operable to receive data traffic originating from both the applications 250 and the user interfaces 260 which relate to the initiation, status, and processing of tasks. The engine 220 is operable to make any conversions necessary to ensure that traffic between certain applications 250 and user interfaces 260 is compatible. The engine 220 is also operable to monitor the data traffic to log various statistics (which are stored in the data repository 270) relating to the tasks and to ensure that tasks are timely completed.

Data associated with a task may be comprised of a plurality of fields. These fields used by the engine 220 may be used when converting/translating data originating from an application 250 or from a user interface 260 of an entity (assignee) responding to a task. The fields may be used so that data generated by an application 250 or user interface may be directly mapped into a format for a user interface 260 associated with an assignee. The mapping may be configured manually or it may be accomplished using a search agent which dissects fields within the task messages and associates them with field categories.

Fields may include, for example, one or more of the following: an ID field that includes a unique identification of a task or a task type, a process ID field that provides a unique identification of a process that created a task, an assigner field that identifies the application or process that assigned the task (and optionally generated the task), an assignee field that identifies an entity (or group of entities) to which the task has been assigned, an optional assignee field indicating the original assignee of the task in cases of a task being delegation, forwarded, or substituted, a title field containing a title of the task, a description field containing a description of the task, a note field allowing for the entry of notes by various users/entities, a priority field indicating a priority level for the task, a content field containing aligned information to the task type (e.g. related documents or business objects), a completion field indicating a degree of completion of a task (e.g., by percentage, milestone, etc.), a status field indicating a processing state of the task (e.g., open, closed, partially completed, overdue, etc.), a confidentiality field indicating a level of confidentiality of the task (e.g., sensitive, confidential, etc.), a category field that indicates a categorization of a task which may be used to identify certain compatible user interfaces and other functionality associated with the task, an initiation date indicating a time and/or date on which a task was assigned, a due date field indicating a deadline before which the task needs to be completed, a completed date field indicating a completion time and/or date of a task, a read date indicating a time and/or date in which the assignee read the task, a start date field indicating a date on which work associated with the task should be initiated, an expiration date indicating a date upon which the task is removed from an input queue of the assignee (e.g., an inbox) if the task has not been completed or completed beyond a predetermined level, a claim date indicating the date when an entity other than the assignee claimed responsibility for the task, a history field indicating history information associated with the task, and the like.

The engine 220 may be used to perform certain operations on various task data that is received and transmitted by the apparatus 200. The engine 220 may act as an intelligent monitoring agent so that the completion progress of each of the tasks is logged and actions may be taken if there are any delays associated with the completion of the tasks by an entity. This monitoring may be accomplished, for example, by accessing various fields within data exchanged between the applications 250 and the user interfaces 260 via the apparatus 200. In some variations, the engine 220 monitors responses from applications 250 and determines whether they meet certain pre-defined criteria (which indicates whether the task has been completed).

For example, the engine 220 may indicate whether: a certain task has been completed, whether a work item or alert associated with a task needs to be transferred to one or more agents associated with the assignee entity (e.g., a supervisor of the assignee) and/or removed from an inbox or other input queue of assignee, a transferred work item or alert needs to be returned back to the assignee, whether to decline, reject, or delete a task prior to delivery to the assignee or agent and/or prior to delivery of a response by an assignee or agent, whether additional notification needs to be sent to the assignee or its agent (e.g., a pop-up message, etc.) when a task is overdue, data associated with a task needs to be placed in reserve and in a resubmission queue for future processing, tasks or category of tasks have been delegated by the assignee and the status of such delegated tasks (e.g., forwarding task to another entity, removing task from inbox, maintaining a copy of the task, etc.), an entity which was delegated a task has accepted, forwarded, or rejected the task, a task is shared among two or more entities, a task is to re-occur periodically, tasks are overdue, responses to tasks are complete, attachments or URLs should be added to data associated with the task, and the like. In some variations, the engine 220 may be polled via the communications network 240 to obtain information relating to the status of various tasks. In addition, the engine 220 may periodically poll one or more of the applications 250 in order to determine alternate entities to which a task should be assigned (in cases in which a task has not been timely completed).

The apparatus 200 may also determine a user interface currently utilized by an entity to which the task has been assigned. This information may be obtained, for example, by polling a node associated with the entity, using an IP address for the node, and/or by receiving periodic beacon signals from the node and/or the user interface. In addition, a modality of the entity may be determined such that certain data formatting may take into account whether the entity is available via a mobile communications device (e.g., a mobile phone), a desktop, or a laptop.

Figure 3:
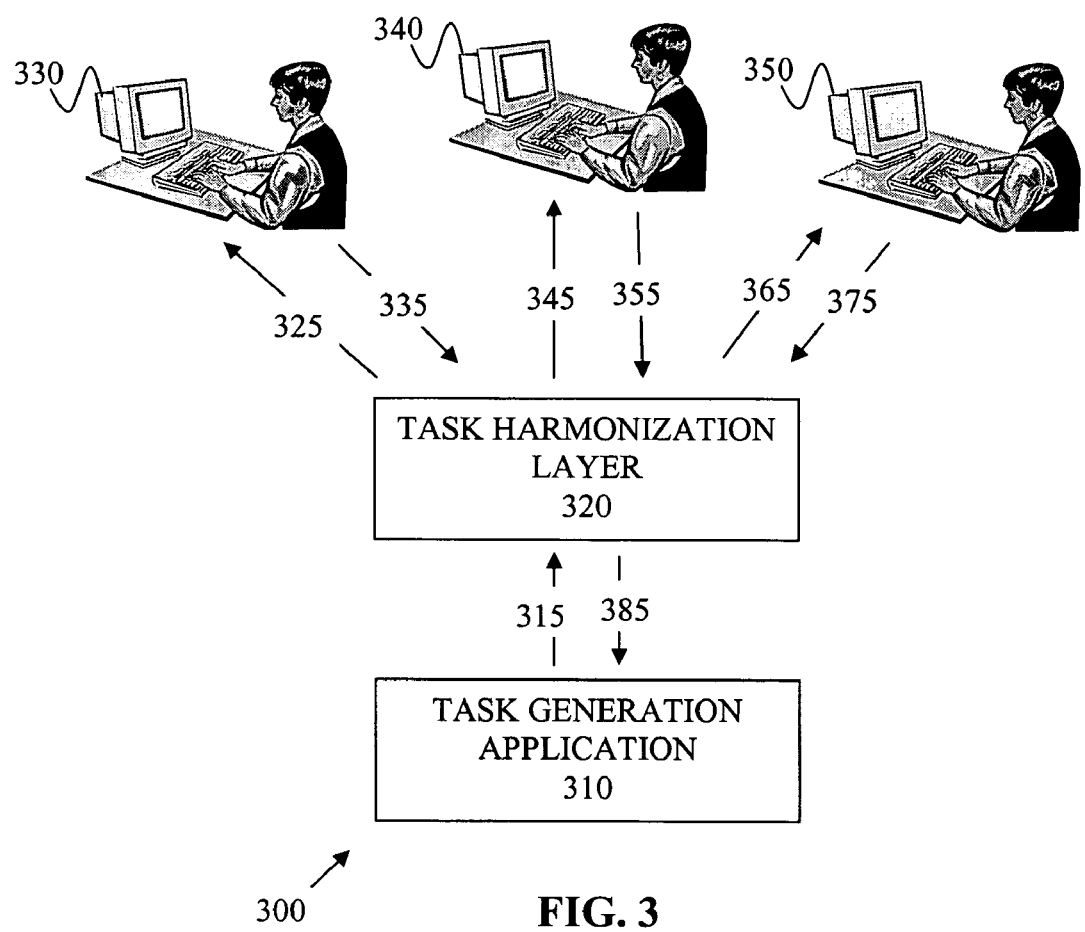
FIG. 3 is a process flow diagram in which a task generation application assigns tasks to a plurality of user interfaces for sequential processing by the user interfaces.

FIG. 3 illustrates an arrangement in which a task generation application 310 generates a single task containing multiple sub-portions that are to be handled by multiple entities 330, 340, 350 (e.g., end users) in a sequential manner. The task generation application 310, at 315, transmits data associated with the task to a task harmonization layer 320 (which may comprise the apparatus 200 illustrated in FIG. 2). The task harmonization layer 320 may convert the received data so that it is compatible with a user interface associated with a first entity 330 and transmit, at 325, the converted data. Once the first entity 330 has finished his or her portion of the task, a response is sent, at 335, to the task harmonization layer 320 indicating the same. The task harmonization layer may then convert either the response from the first entity 330 or the original transmission received from the task generation application 310 (at 315) so that it is compatible with the second entity 340. Data identifying the task may then be transmitted, at 345 to the second entity 340 which results in a response, at 355. Similarly, the task harmonization layer 320 may then make any necessary conversions to the task so that it may be transmitted, at 365 to a third entity 350 which in turns responds, at 375, upon completion of the task. The task harmonization layer 320 may then transmit, at 385, data after making any required format conversions indicating the completion of the task to the task generation application 310.

Figure 4:
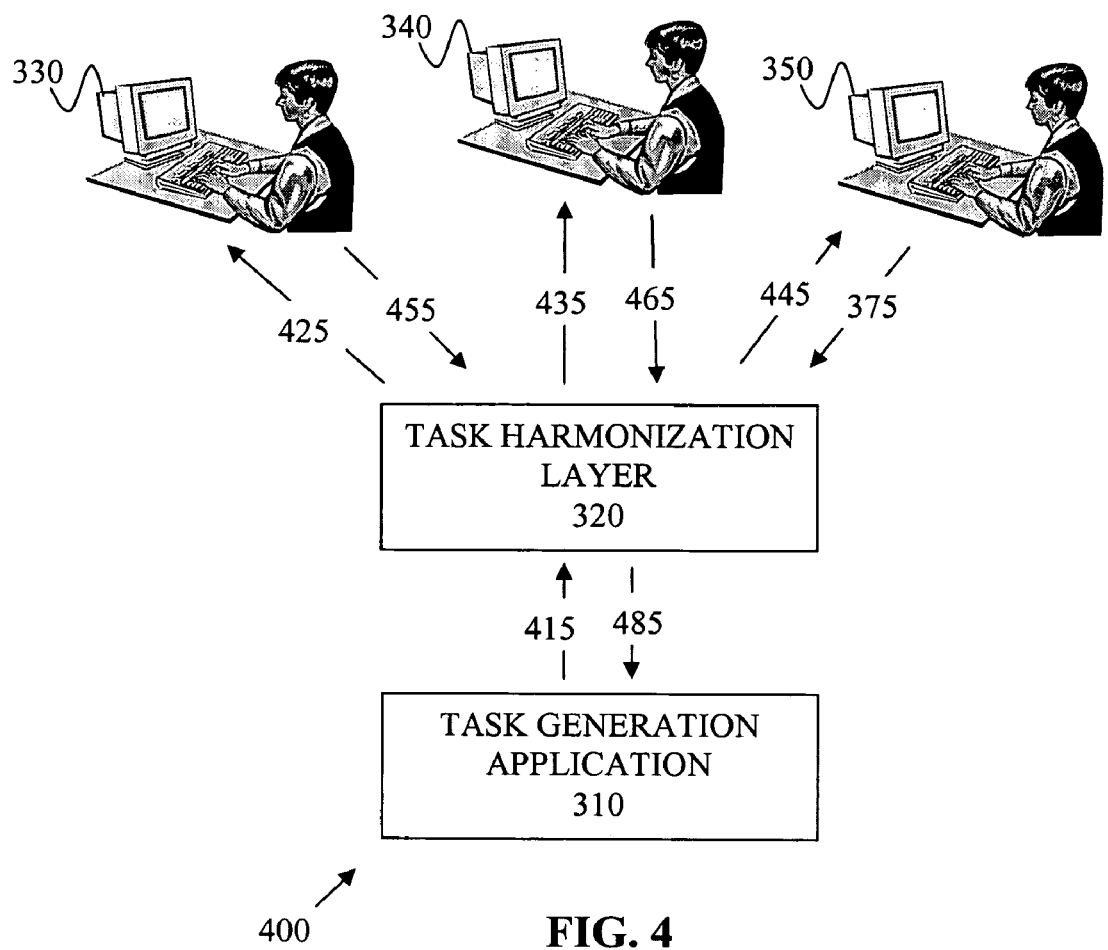
FIG. 4 is a process flow diagram in which a task generation application assigns tasks to a plurality of user interfaces for parallel processing by the user interfaces.

FIG. 4 illustrates an arrangement in which the task generation application 310 generates a single task containing multiple sub-portions that are to be handled by multiple entities 330, 340, 350 (e.g., end users) in parallel. With this variation, the task generation application 310, at 415, transmits data associated with the task to the task harmonization layer 320. The task harmonization layer may convert the received data so that it is compatible with a user interface associated with each of the entities 330, 340, and 350. However, in contrast to the arrangement of FIG. 3 in which each entity 330, 340, and 350 serially completed his or her portion of the task, the task harmonization layer 320 simultaneously transmits (i.e., transmits without regard to the completion of the portion of the task by any of the entities 330, 340, 350), at 325, 335, 345, data associated with the task in a compatible format to each of the entities 330, 340, 350. Thereafter, the entities 340, respectively send, at 355, 365, 375, data to the task harmonization layer 320 as they complete the task. The task harmonization layer 320 may then report or otherwise transmit data, at 385, to the task generation application 310 indicating that the task has been completed. Other variations may be implemented such that tasks having nested portions are processed and that the task generation application is notified when portions of tasks have been completed.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer program product, tangibly embodied on computer-readable storage media, the computer program product being operable to cause a data processing apparatus to:
    receive, by a task harmonization layer, first data associated with a task originating from one of a plurality of applications via a communications network, wherein the first data comprises a plurality of fields characterizing requirements for the task and status information regarding the requirements;
    identify, by the task harmonization layer, an entity to which the task has been assigned;
    determine, by the task harmonization layer, a delivery context for the entity;
    convert, by the task harmonization layer, a format of the first data to be compatible with the determined delivery context to generate second data, wherein the second data comprises a plurality of fields characterizing requirements for the task and status information regarding the requirements, wherein the converting maps fields in the first data to fields in the second data using a search agent which dissects the fields in the first data and associates them with field categories;
    transmit, by the task harmonization layer, the second data to a first node associated with the entity via the communications network, wherein a user interface associated with the first node is operable to initiate one or more transactions associated with the task using the second data, wherein a user interface currently being utilized is determined by polling the first node and by receiving periodic beacon signals from the first node and from the user interface;
    monitor, by the task harmonization layer, for responses to the transmission of the second data, the monitoring comprising accessing fields in data passing through the task harmonization layer exchanged between the applications and the user interface, the monitoring identifying a current status of the task by determining whether the responses meet pre-defined criteria;
    determine, by the task harmonization layer, an alternative delivery context for the entity if a response to the transmission of the second data is not received within a predetermined time interval and does not meet pre-determined criteria;
    convert, by the task harmonization layer, the format of the first data to be compatible with the determined alternative delivery context to generate third data; and
    transmit, by the task harmonization layer, the third data to the alternative entity via the communications network, wherein the alternative entity is operable to initiate one or more transactions associated with the task using the third data.

2. A computer program product as in claim 1, wherein the computer program product is further operable to cause a data processing apparatus to: route the first data to the first node according to the determined delivery context if the first data is compatible with the determined delivery context.

3. A computer program product as in claim 1, wherein the computer program product is further operable to cause a data processing apparatus to: receive fourth data via the communications network generated by the entity in response to the transmission of the second data indicating a processing state of the task.

4. A computer program product as in claim 3, wherein the computer program product is further operable to cause a data processing apparatus to:
    convert a format of the fourth data to be compatible with the originating one of the plurality of applications to generate fifth data; and
    transmit the fifth data to a second node associated with the originating one of the plurality of applications via the communications network.

5. A computer program product as in claim 1, wherein the computer program product is further operable to cause a data processing apparatus to: retransmit the second data to the first node via the communications network if a response to the second data is not received within a predetermined time interval.

6. A computer program product as in claim 1, wherein the computer program product is further operable to cause a data processing apparatus to: retransmit the second data to the first node via the communications network if a response to the second data meeting pre-determined criteria is not received within a predetermined time interval.

7. A computer program product as in claim 1, wherein the computer program product is further operable to cause a data processing apparatus to: log receipt of data associated with the task in a data repository.

8. A computer program product as in claim 1, wherein determining a delivery context for the entity comprises: associating a delivery platform with the user interface.

9. A computer program product as in claim 1, wherein the computer program product is further operable to cause a data processing apparatus to: transmit the second data to a third node associated with the entity via the communications network simultaneously with the transmitting the second data to the first node, wherein a user interface associated with the third node is operable to initiate one or more transactions associated with the task using the second data.

10. A computer program product as in claim 1, wherein determining the delivery context for the entity comprises: determining a notification modality associated with the user.

11. A computer program product, tangibly embodied on computer-readable storage media, the computer program product being operable to cause a data processing apparatus to:
    receive, by a first node associated with an entity, second data from a task harmonization layer, the second data being associated with first data for a task generated by one of a plurality of applications; and
    initiate, by a user interface associated with the entity, one or more transactions associated with the task using the second data;
    wherein the task harmonization layer:
        receives the first data, wherein the first data comprises a plurality of fields characterizing requirements for the task and status information regarding the requirements;
        identifies the entity as being the entity to which the task has been assigned;
        determines a delivery context for the entity;

converts a format of the first data to be compatible with the determined delivery context to generate the second data, wherein the second data comprises a plurality of fields characterizing requirements for the task and status information regarding the requirements, wherein the converting maps fields in the first data to fields in the second data using a search agent which dissects the fields in the first data and associates them with field categories;

transmits the second data to the first node associated with the entity via the communications network, wherein a user interface associated with the first node is operable to initiate one or more transactions associated with the task using the second data, wherein a user interface currently being utilized is determined by polling the first node and by receiving periodic beacon signals from the first node and from the user interface:

monitors for responses to the transmission of the second data, the monitoring comprising accessing fields in data passing through the task harmonization layer exchanged between the applications and the user interface, the monitoring identifying a current status of the task by determining whether the responses meet pre-defined criteria;

determines an alternative delivery context for the entity if a response to the transmission of the second data is not received within a predetermined time interval and does not meet pre-determined criteria;

converts the format of the first data to be compatible with the determined alternative delivery context to generate third data; and transmits the third data to the alternative entity via the communications network, wherein the alternative entity is operable to initiate one or more transactions associated with the task using the third data.

12. A method for implementation by a task harmonization layer being executed on one or more data processors, the method comprising:

receiving, by the task harmonization layer, first data associated with a task originating from one of a plurality of applications via a communications network, wherein the first data comprises a plurality of fields characterizing requirements for the task and status information regarding the requirements;

identifying, by the task harmonization layer, an entity to which the task has been assigned;

determining, by the task harmonization layer, a delivery context for the entity;

converting, by the task harmonization layer, a format of the first data to be compatible with the determined delivery context to generate second data, wherein the second data comprises a plurality of fields characterizing requirements for the task and status information regarding the requirements, wherein the converting maps fields in the first data to fields in the second data using a search agent which dissects the fields in the first data and associates them with field categories;

transmitting, by the task harmonization layer, the second data to a first node associated with the entity via the communications network, wherein a user interface associated with the first node is operable to initiate one or more transactions associated with the task using the second data, wherein a user interface currently being utilized is determined by polling the first node and by receiving periodic beacon signals from the first node and from the user interface;

monitoring, by the task harmonization layer, for responses to the transmission of the second data, the monitoring comprising accessing fields in data passing through the harmonization layer exchanged between the applications and the user interface, the monitoring identifying a current status of the task by determining whether the responses meet pre-defined criteria;

determining, by the task harmonization layer, an alternative delivery context for the entity if a response to the transmission of the second data is not received within a predetermined time interval and does not meet pre-determined criteria;

converting, by the task harmonization layer, the format of the first data to be compatible with the determined alternative delivery context to generate third data; and transmitting, by the task harmonization layer, the third data to the alternative entity via the communications network, wherein the alternative entity is operable to initiate one or more transactions associated with the task using the third data.

* * * * *

UNITED STATES PATENT AND TRADEMARK OFFICE
CERTIFICATE OF CORRECTION

| | | |
|---|---|---|
| PATENT NO. | : 7,810,101 B2 | Page 1 of 1 |
| APPLICATION NO. | : 11/315577 | |
| DATED | : October 5, 2010 | |
| INVENTOR(S) | : Gunther Rothermel et al. | |

It is certified that error appears in the above-identified patent and that said Letters Patent is hereby corrected as shown below:

On the cover of the patent, at item (73) under "Assignee", delete

"SAG AG,"

In its place, insert on the cover of the patent, at item (73) under "Assignee",

--SAP AG--

Signed and Sealed this
Fourth Day of October, 2011

David J. Kappos
*Director of the United States Patent and Trademark Office*